UNITED STATES PATENT OFFICE.

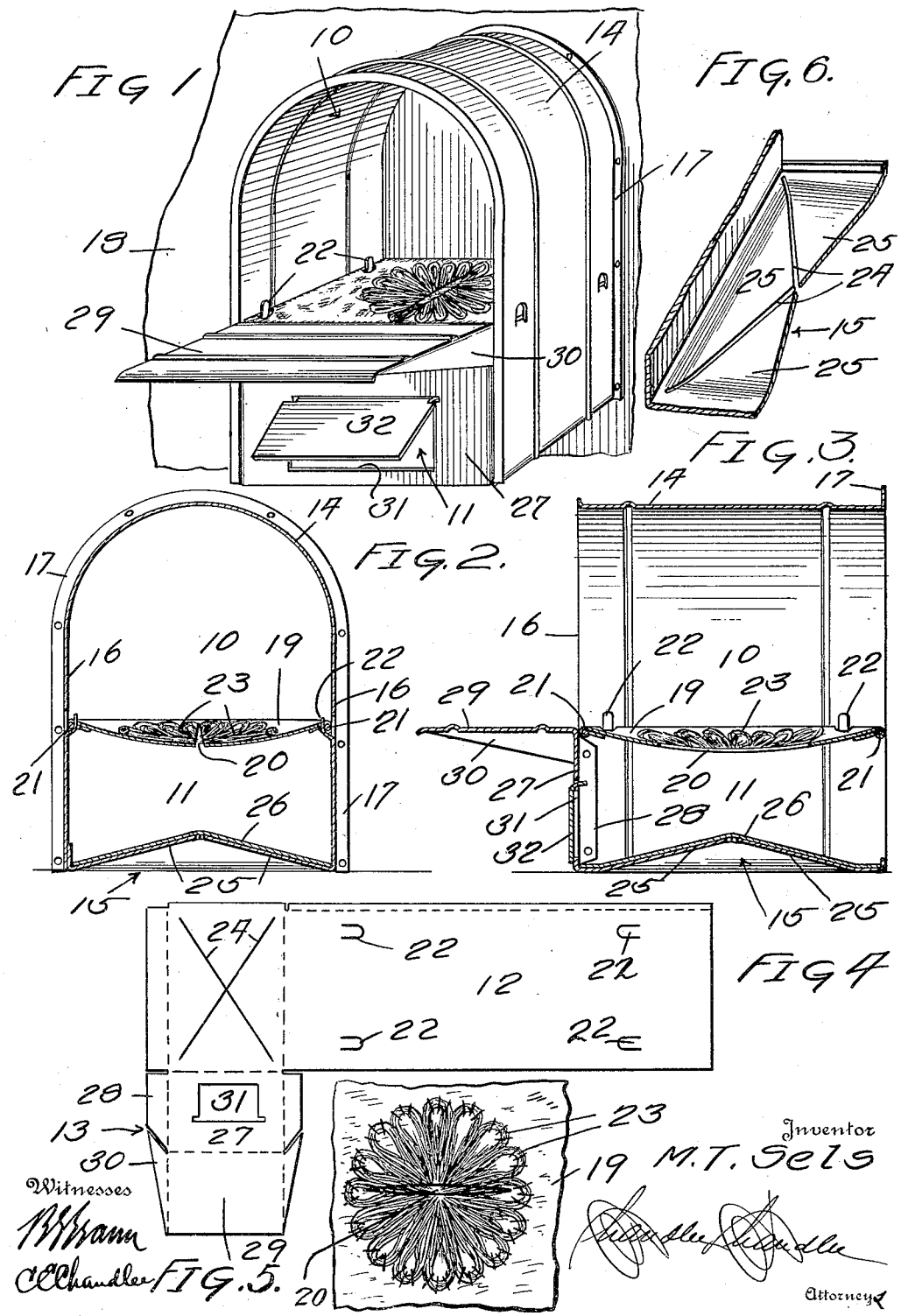

MARTINUS T. SELS, OF KNOXVILLE, IOWA.

HEN'S NEST.

1,149,544.

Specification of Letters Patent.

Patented Aug. 10, 1915.

Application filed January 13, 1915. Serial No. 2,027.

*To all whom it may concern:*

Be it known that I, MARTINUS T. SELS, a citizen of the United States, residing at Knoxville, in the county of Marion, State of Iowa, have invented certain new and useful Improvements in Hens' Nests; and I do hereby declare the following to be a full, clear, and exact description of the invention, such as will enable others skilled in the art to which it appertains to make and use the same.

This invention relates to poultry appliances and more particularly to a nest box of improved and novel construction.

An object of the invention resides in the provision of a nest box in which the parts are so constructed and arranged as to provide separate compartments for the hens and eggs and thereby prevent the latter being soiled, broken or eaten by the hens as often occurs in present types of nests.

A further object of the invention is to provide a hen's nest in which the body thereof may be stamped and formed from a single blank of material, novel means being embodied for removably securing the nest bottom therein.

A still further object is to provide a device of the above nature which includes a novel form of cushioning element for breaking the fall of the eggs from the nest bottom, such cushion to be stamped and formed in the bottom of the nest box whereby a distinct saving in material and labor will be effected.

With the above and other objects of similar nature in view, the invention consists in the construction, combination and arrangement of parts, set forth in and falling within the scope of the appended claim.

In the drawing:—Figure 1 is a perspective view of a nest constructed in accordance with the invention. Fig. 2 is a vertical transverse sectional view therethrough. Fig. 3 is a sectional view taken at right angles to Fig. 2. Fig. 4 is a plan view of the blank from which the body of the nest is constructed. Fig. 5 is a sectional perspective view through the bottom of the nest body, and Fig. 6 is a plan view of the nest bottom, parts thereof being broken away.

Referring now more particularly to the drawing, the device comprises essentially a nesting compartment 10 and an egg compartment 11, the latter being adapted to receive the eggs when laid and being conveniently accessible when it is desired to gather the same without disturbing the hen upon the nest.

In constructing the nest, there is utilized a single blank of rust proof metal preferably galvanized tin, including a rectangular body portion 12 and a lateral extension 13, said body portion being bent to provide the top 14, bottom 15 and sides 16 of the nest box, and having a portion of its side margin, remote from said lateral extension, directed angularly and apertured as at 17 whereby the nest may be conveniently supported above the floor, the wall 18 or other support to which it is applied, also serving as a closure for the back of the box. Arranged within the box thus formed and dividing same into the nesting and egg compartments above referred to, is a flexible nest bottom 19, said bottom consisting of canvas or other suitable material and having formed centrally thereof an elongated slit 20, the eggs when laid being adapted to pass through this slit and into the compartment 11 provided for the purpose. In supporting the nest bottom within the box so that same may be readily removed when desired, there is employed a wire frame 21 which is secured along the marginal edges of the nest bottom and is adapted for detachable engagement with suitable hooks 22, said hooks being stamped and bent inwardly from the sides 16 of the box and serving to securely retain the frame in position.

To lend the appearance of a nest to the bottom 19 there are arranged thereon and surrounding the slit 20 a number of flexible loops 23, each of said loops comprising a plurality of strands of hemp or like material and being secured at their bight to the bottom 19 while their free ends are projected over and cover the slit 20. Thus it is obvious that when an egg is laid the same will pass readily through the slit 20 and drop into the compartment 11 as above described.

To cushion the fall of the egg into the compartment 12, the bottom 15 of the nest box is formed with a pair of crossed diagonal slits 24 resulting in resilient fingers 25, these fingers being bent upwardly to a point beneath the slit 20 in the nest bottom and yielding readily when engaged by the egg in its fall. A suitable lining 26 is also placed in the bottom 15 to cover the fingers 25 and prevent direct contact of the eggs therewith.

In closing the front of the egg compartment 11, the lateral extension 13 of the blank is bent upwardly against the sides 16, the side edges of the front 27 thus formed being directed inwardly and riveted as at 28 to the sides 16. The remaining portion of the extension 13 is then directed outwardly from the nest box to provide a suitable platform 29, this platform being disposed adjacent the entrance to the nest and assisting the hens in entering or leaving the same. To brace the platform 29, the side edges 30 thereof are bent downwardly and engage the front of the egg compartment as is best shown in Fig. 1.

Formed on the front 27 of the compartment 11 is a rectangular opening 31 and adapted to normally close said opening is a hinged door 32, said door being conveniently opened when it is desired to gather the eggs without disturbing the hen upon the nest.

What is claimed, is:—

A nest box formed from a single blank of sheet material, said blank including a rectangular body portion bent to provide the top, bottom and sides of the box and a lateral portion extending from a side edge of the blank and bent upwardly along the front edges of said sides and thence outwardly at right angles to provide a platform, a flexible nest bottom centrally apertured and removably supported between the sides of the box and dividing same vertically into a nesting and an egg compartment the former opening toward the platform, and resilient fingers formed from the bottom of the box and bent upwardly beneath the opening in the nest bottom to cushion an egg in its fall through said opening.

In testimony whereof, I affix my signature, in the presence of two witnesses.

MARTINUS T. SELS.

Witnesses:
J. A. VANDERWAL,
LEONARD WEYERS.

Copies of this patent may be obtained for five cents each, by addressing the "Commissioner of Patents, Washington, D. C."